(12) United States Patent
Backer et al.

(10) Patent No.: US 9,181,379 B2
(45) Date of Patent: Nov. 10, 2015

(54) MODIFIED POLYOLEFINS

(75) Inventors: Michael Backer, Marbais (BE);
Francois De Buyl, Hoeilaart (BE);
Damien Deheunynck, Braine l'Alleud
(BE); Jean De La Croix Habimana,
Morlanwelz (BE); Vincent Rerat,
Tubize (BE); Valerie Smits, Lobbes
(BE)

(73) Assignee: DOW CORNING CORPORATION,
Midland, MI (US)

( * ) Notice: Subject to any disclaimer, the term of this patent is extended or adjusted under 35 U.S.C. 154(b) by 186 days.

(21) Appl. No.: 13/520,859

(22) PCT Filed: Dec. 22, 2010

(86) PCT No.: PCT/EP2010/070482
§ 371 (c)(1),
(2), (4) Date: Jul. 6, 2012

(87) PCT Pub. No.: WO2011/083045
PCT Pub. Date: Jul. 14, 2011

(65) Prior Publication Data
US 2012/0283346 A1    Nov. 8, 2012

(30) Foreign Application Priority Data
Jan. 6, 2010 (GB) .................................. 1000121.2

(51) Int. Cl.
*C08L 23/26* (2006.01)
*C08F 255/02* (2006.01)
*C08F 212/14* (2006.01)
*C08F 230/08* (2006.01)

(52) U.S. Cl.
CPC ............. *C08F 255/02* (2013.01); *C08F 212/14* (2013.01); *C08F 230/08* (2013.01)

(58) Field of Classification Search
USPC ............... 525/275, 279, 288, 309, 313, 326.5
See application file for complete search history.

(56) References Cited

U.S. PATENT DOCUMENTS

| | | |
|---|---|---|
| 3,075,948 A | 1/1963 | Santelli |
| 3,179,612 A | 4/1965 | Plueddemann |
| 3,258,477 A | 6/1966 | Plueddemann et al. |
| 3,414,551 A | 12/1968 | Reid et al. |
| 3,458,460 A | 7/1969 | Shepard et al. |
| 3,503,943 A | 3/1970 | Kresge et al. |
| 3,646,155 A | 2/1972 | Scott |
| 3,873,642 A | 3/1975 | Jezl |
| 3,873,643 A | 3/1975 | Wu et al. |
| 4,303,763 A | 12/1981 | Beasley |
| 4,481,322 A | 11/1984 | Godlewski et al. |
| 4,529,750 A | 7/1985 | Gimpel |
| 4,702,868 A | 10/1987 | Pontiff et al. |
| 4,709,084 A | 11/1987 | Pavlin et al. |
| 4,730,031 A | 3/1988 | Sato et al. |
| 4,755,262 A | 7/1988 | Matsunaga et al. |
| 4,795,785 A | 1/1989 | Ito et al. |
| 4,857,250 A | 8/1989 | Gale et al. |
| 4,921,916 A | 5/1990 | Howell et al. |
| 4,946,977 A | 8/1990 | Bernhardt et al. |
| 4,990,383 A | 2/1991 | Bergstrom et al. |
| 5,233,006 A | 8/1993 | Wolter et al. |
| 5,373,059 A | 12/1994 | Asanuma et al. |
| 5,382,633 A | 1/1995 | Scott et al. |
| 5,532,398 A | 7/1996 | Wolter et al. |
| 5,661,200 A | 8/1997 | Boudreaux, Jr. et al. |
| 5,684,171 A | 11/1997 | Wideman et al. |
| 5,824,718 A | 10/1998 | Penfold et al. |
| 5,852,099 A | 12/1998 | Vanel |
| 5,918,641 A | 7/1999 | Hardy et al. |
| 5,929,127 A | 7/1999 | Raetzsch et al. |
| 6,013,715 A | 1/2000 | Gornowicz et al. |
| 6,028,146 A | 2/2000 | Kotlar et al. |
| 6,153,691 A | 11/2000 | Gornowicz et al. |
| 6,177,519 B1 | 1/2001 | Chung et al. |
| 6,380,316 B1 | 4/2002 | Bahadur et al. |
| 6,479,580 B1 | 11/2002 | Chorvath et al. |
| 6,500,883 B1 | 12/2002 | Mack et al. |
| 6,590,032 B2 | 7/2003 | Furukawa et al. |
| 6,590,036 B2 | 7/2003 | Koike et al. |
| 6,590,039 B1 | 7/2003 | Wang et al. |
| 6,632,888 B2 | 10/2003 | Obrecht et al. |
| 6,774,255 B1 | 8/2004 | Tardivat et al. |
| 6,841,694 B2 | 1/2005 | Pfeiffer |
| 6,864,322 B2 | 3/2005 | Gehlsen et al. |
| 6,864,323 B2 | 3/2005 | Schlosser et al. |
| 6,984,747 B2 | 1/2006 | Jacob et al. |
| 7,015,297 B2 | 3/2006 | Schindler et al. |

(Continued)

FOREIGN PATENT DOCUMENTS

| | | |
|---|---|---|
| BE | 652324 A | 2/1965 |
| CA | 1099840 A1 | 4/1981 |

(Continued)

OTHER PUBLICATIONS

English language abstract and machine-assisted translation for JP2004232498 extracted from espacenet.com on Apr. 7, 2014, 31 pages.

(Continued)

*Primary Examiner* — Jeffrey Mullis
(74) *Attorney, Agent, or Firm* — Howard & Howard Attorneys PLLC

(57) ABSTRACT

The invention provides a process for grafting silane or silicone functionality onto a polyolefin, comprising reacting the polyolefin with an unsaturated monomer (A) containing an olefinic —C═C— bond or acetylenic —C≡C— bond and a reactive functional group X in the presence of means capable of generating free radical sites in the polyolefin and with an organosilicon compound (B) having a functional group Y which is reactive with the functional group X of the unsaturated monomer (A), characterized in that the unsaturated monomer (A) contains an aromatic ring or a further olefinic double bond or acetylenic unsaturation, the aromatic ring or the further olefinic double bond or acetylenic unsaturation being conjugated with the olefinic —C═C— or acetylenic —C≡C— unsaturation of the unsaturated monomer (A).

6 Claims, No Drawings

(56) References Cited

U.S. PATENT DOCUMENTS

| | | | |
|---|---|---|---|
| 7,041,744 B2 | 5/2006 | Palmlof et al. | |
| 7,074,876 B2 | 7/2006 | Cruse et al. | |
| 7,078,449 B2 | 7/2006 | Pagano et al. | |
| 7,238,740 B2 | 7/2007 | Belin et al. | |
| 7,241,824 B2 | 7/2007 | Mangeret et al. | |
| 7,544,743 B2 | 6/2009 | Ciardelli et al. | |
| 8,008,524 B2 | 8/2011 | Cruse et al. | |
| 8,013,178 B2 | 9/2011 | Klockmann et al. | |
| 8,227,522 B2 | 7/2012 | Mizote et al. | |
| 8,569,417 B2 * | 10/2013 | Backer et al. | 525/105 |
| 2002/0040101 A1 | 4/2002 | Furukawa et al. | |
| 2003/0114604 A1 | 6/2003 | Schlosser et al. | |
| 2003/0139621 A1 | 7/2003 | Jacob et al. | |
| 2003/0144403 A1 | 7/2003 | Barruel et al. | |
| 2005/0004386 A1 | 1/2005 | Deschler et al. | |
| 2005/0031813 A1 | 2/2005 | Conrnette et al. | |
| 2005/0107551 A1 | 5/2005 | Lang et al. | |
| 2005/0119436 A1 | 6/2005 | Ziche et al. | |
| 2005/0131154 A1 | 6/2005 | Cai et al. | |
| 2005/0269737 A1 | 12/2005 | Hogge et al. | |
| 2005/0272867 A1 | 12/2005 | Hogge et al. | |
| 2005/0287300 A1 | 12/2005 | Herrwerth et al. | |
| 2006/0025506 A1 | 2/2006 | Weller et al. | |
| 2009/0017358 A1 * | 1/2009 | Kawada | 429/33 |
| 2009/0143531 A1 | 6/2009 | Ouhadi et al. | |
| 2009/0186961 A1 | 7/2009 | Araujo Da Silva et al. | |
| 2009/0234066 A1 | 9/2009 | Araujo Da Silva et al. | |
| 2009/0264584 A1 | 10/2009 | Walia et al. | |
| 2009/0292044 A1 | 11/2009 | Kawazura et al. | |
| 2010/0016500 A1 | 1/2010 | Sone et al. | |
| 2010/0040927 A1 | 2/2010 | Yoshida et al. | |
| 2010/0168343 A1 | 7/2010 | Harris et al. | |
| 2011/0152458 A1 | 6/2011 | Araujo Da Silva et al. | |
| 2011/0172367 A1 | 7/2011 | Backer et al. | |
| 2011/0178198 A1 | 7/2011 | Backer et al. | |
| 2011/0190411 A1 | 8/2011 | Backer et al. | |
| 2011/0287205 A1 | 11/2011 | Klockmann et al. | |
| 2012/0059121 A1 | 3/2012 | Backer et al. | |
| 2012/0065319 A1 | 3/2012 | Backer et al. | |
| 2012/0283362 A1 | 11/2012 | Backer et al. | |
| 2012/0283388 A1 | 11/2012 | Backer et al. | |
| 2012/0289620 A1 | 11/2012 | Deheunynck et al. | |

FOREIGN PATENT DOCUMENTS

| | | |
|---|---|---|
| CN | 1747976 A | 3/2006 |
| DE | 10223073 C1 | 10/2003 |
| DE | 102006059295 A1 | 6/2008 |
| EP | 0225186 A2 | 6/1987 |
| EP | 0245938 A2 | 11/1987 |
| EP | 0276790 A2 | 8/1988 |
| EP | 0372561 A2 | 6/1990 |
| EP | 0581150 A2 | 2/1994 |
| EP | 0735088 A1 | 10/1996 |
| EP | 0776945 A2 | 6/1997 |
| EP | 0809672 B1 | 12/1997 |
| EP | 0900801 A1 | 3/1999 |
| EP | 0943635 A1 | 9/1999 |
| EP | 0451709 B1 | 12/1999 |
| EP | 1018533 A2 | 7/2000 |
| EP | 1022302 A2 | 7/2000 |
| EP | 1050548 A1 | 11/2000 |
| EP | 0450624 B1 | 9/2001 |
| EP | 1134251 A1 | 9/2001 |
| EP | 1270581 A2 | 1/2003 |
| EP | 1318153 A1 | 6/2003 |
| EP | 1323779 A1 | 7/2003 |
| EP | 1354912 A1 | 10/2003 |
| EP | 1375569 A1 | 1/2004 |
| EP | 1619214 A1 | 1/2006 |
| EP | 1683801 A2 | 7/2006 |
| EP | 1721930 A1 | 11/2006 |
| EP | 1818186 A1 | 8/2007 |
| EP | 1942131 A1 | 7/2008 |
| EP | 0958298 B2 | 10/2008 |
| EP | 2039705 A1 | 3/2009 |
| EP | 2085419 A1 | 8/2009 |
| GB | 957917 A | 5/1964 |
| GB | 1020740 A | 2/1966 |
| GB | 1407827 | 9/1975 |
| GB | 2134530 A | 8/1984 |
| GB | 2192891 A | 1/1988 |
| GB | 2202537 A | 2/1988 |
| JP | S4317511 Y1 | 7/1968 |
| JP | S58-093704 A | 6/1983 |
| JP | 59-147035 A | 8/1984 |
| JP | S62-135505 A | 6/1987 |
| JP | 3143979 A | 6/1991 |
| JP | H05-500686 A | 2/1993 |
| JP | 05-070529 A | 3/1993 |
| JP | 06-172459 | 6/1994 |
| JP | 2002-037960 A | 2/2002 |
| JP | 2004232498 A | 8/2004 |
| JP | 2007517074 A | 6/2007 |
| JP | 2007-308653 A | 11/2007 |
| JP | 2007329069 | 12/2007 |
| JP | 2008097868 A | 4/2008 |
| JP | 2008-106118 A | 5/2008 |
| JP | 2008-142112 | 6/2008 |
| JP | 2008-184545 | 8/2008 |
| WO | WO 87/05916 A2 | 10/1987 |
| WO | WO 00/52072 A1 | 9/2000 |
| WO | WO 00/52073 A1 | 9/2000 |
| WO | WO 0052071 A1 | 9/2000 |
| WO | WO 00/63293 A1 | 10/2000 |
| WO | WO 01/49781 A1 | 7/2001 |
| WO | WO 01/49782 A1 | 7/2001 |
| WO | WO 01/49783 A1 | 7/2001 |
| WO | WO 02/22728 A1 | 3/2002 |
| WO | WO 03/091314 A1 | 11/2003 |
| WO | WO 2004072135 A1 | 8/2004 |
| WO | WO 2004/078813 A2 | 9/2004 |
| WO | WO 2005/001037 A2 | 1/2005 |
| WO | WO 2005/007066 A2 | 1/2005 |
| WO | WO 2005/103061 A1 | 11/2005 |
| WO | WO 2006/019468 A1 | 2/2006 |
| WO | WO 2006015010 A2 | 2/2006 |
| WO | WO 2006/125532 A1 | 11/2006 |
| WO | WO 2006/125533 A1 | 11/2006 |
| WO | WO 2006/125534 A1 | 11/2006 |
| WO | WO 2007008765 A2 | 1/2007 |
| WO | WO 2007/014687 A1 | 2/2007 |
| WO | WO 2007/061550 A1 | 5/2007 |
| WO | WO 2007/147687 A1 | 12/2007 |
| WO | WO 2008/004686 A1 | 1/2008 |
| WO | WO 2008/042418 A1 | 4/2008 |
| WO | WO 2009/073274 A1 | 6/2009 |
| WO | WO 2010/000477 A1 | 1/2010 |
| WO | WO 2010/000478 A1 | 1/2010 |
| WO | WO 2010/000479 A1 | 1/2010 |
| WO | WO 2010/003007 A2 | 1/2010 |
| WO | WO 2010/005525 A1 | 1/2010 |
| WO | WO 2010/125123 A1 | 11/2010 |
| WO | WO 2010/125124 A1 | 11/2010 |
| WO | WO 2011/083043 A1 | 7/2011 |
| WO | WO 2011/083044 A1 | 7/2011 |
| WO | WO 2011/083046 A1 | 7/2011 |

OTHER PUBLICATIONS

English language abstract and machine-assisted English translation for JP 2008-142112 extracted from the PAJ database on Jul. 25, 2013, 24 pages.

English language abstract for WO 2008/004686 extracted from the espacenet.com database on Jul. 25, 2013, 50 pages.

English language abstract and translation for JP 06-172459 extracted from the PAJ database on Jul. 13, 2011, 25 pages.

English language abstract and translation for JP 2007329069 extracted from the PAJ database on Jul. 13, 2012, 26 pages.

English language abstract for JP 2008097868 extracted from the espacenet.com database on Jul. 13, 2012, 33 pages.

English language abstract for JP 59-147035 extracted from the PAJ database on Oct. 31, 2012, 9 pages.

(56) References Cited

OTHER PUBLICATIONS

English language abstract and translation for JP 2007-308653 extracted from the PAJ database on Oct. 31, 2012, 71 pages.
English language abstract and translation extracted for JP 05-070529 from the PAJ database on Oct. 31, 2012, 76 pages.
English language abstract for EP 0735088 extracted from the espacenet.com database on Nov. 5, 2012, 13 pages.
English language abstract and machine-assisted English translation for DE 102006059295 extracted from the espacenet.com database on Nov. 5, 2012, 39 pages.
English language abstract for JP 3143979 extracted from the espacenet.com database on Nov. 5, 2012, 12 pages.
English language abstract for EP 1318153 extracted from the espacenet.com database on Sep. 10, 2012, 11 pages.
International Search Report for Application No. PCT/EP2010/070481 dated Feb. 4, 2011, 3 pages.
English language abstract for DE 10223073 extracted from the espacenet.com database on Apr. 9, 2012, 10 pages.
English language abstract for EP 0450624 extracted from the espacenet.com database on Apr. 9, 2012, 36 pages.
English language abstract for EP 0451709 extracted from the espacenet.com database on Apr. 9, 2012, 24 pages.
English language abstract for EP 0735088 extracted from the espacenet.com database on Apr. 9, 2012, 13 pages.
English language abstract for EP 1683801 extracted from the espacenet.com database on Apr. 9, 2012, 49 pages.
English language abstract for JP 2008-106118 extracted from the PAJ database on Apr. 9, 2012, 27 pages.
English language abstract and translation for JP 2008-184545 extracted from the PAJ database on Apr. 9, 2012, 34 pages.
English language abstract for WO 01/49781 extracted from the espacenet.com database on Apr. 9, 2012, 49 pages.
English language abstract for WO 01/49782 extracted from the espacenet.com database on Apr. 9, 2012, 44 pages.
English language abstract for WO 01/49783 extracted from the espacenet.com database on Apr. 9, 2012, 36 pages.
English language abstract for WO 02/22728 extracted from the espacenet.com database on Apr. 9, 2012, 41 pages.
English language abstract for WO 2006/125532 extracted from the espacenet.com database on Apr. 9, 2012, 40 pages.
English language abstract for WO 2006/125533 extracted from the espacenet.com database on Apr. 9, 2012, 53 pages.
English language abstract for WO 2006/125534 extracted from the espacenet.com database on Apr. 9, 2012, 53 pages.
International Search Report for Application No. PCT/EP2010/055754 dated Oct. 15, 2010, 3 pages.
International Search Report for Application No. PCT/EP2010/055757 dated Jun. 7, 2010, 4 pages.
English language abstract for EP 0245938 extracted from the espacenet.com database on Jul. 13, 2011, 28 pages.
International Search Report for Application No. PCT/EP2009/004797 dated Sep. 4, 2009, 11 pages.
International Search Report for Application No. PCT/EP2009/004798 dated Sep. 1, 2009, 6 pages.
International Search Report for Application No. PCT/EP2009/004799 dated Sep. 9, 2009, 9 pages.
N.C. Liu et al., "Influences of grafting formulations and processing conditions on properties of silane grafted moisture crosslinked polypropylenes", Polymer 41 (2000), pp. 4537-4542.
H. Huang et al., "Influences on grafting formulations and extrusion conditions on properties of silane grafted polypropylenes", Applied Polymer Science 78 (2000), pp. 1233-1238.
Shujing Yang et al., "Mechanism of a One-Step Method for Preparing Silane Grafting and Crosslinking Polypropylene", Polymer Engineering and Science, 2007, pp. 1004-1008.
March's Advanced Organic Chemistry, 5th Edition, John Wiley & Sons, NY 2001, at chapter 15-58, pp. 1062-1063.
B.C. Ranu et al., "Significant rate acceleration of the aza-Michael reaction in water", Tetrahedron Letters 48 (2007), pp. 141-143.
International Search Report for Application No. PCT/EP2010/070480 dated Mar. 4, 2011, 4 pages.
International Search Report for Application No. PCT/EP2010/070482 dated Feb. 2, 2011, 4 pages.
The Vanderbilt Rubber Handbook (1978), pp. 344-346.
Do Hung Han et al., "Crosslinking and degradation of polypropylene by electron beam irradiation in the presence of trifunctional monomers", Radiation Physics and Chemistry 69 (2004) 239-244.
Coiai S. et al., "Control of Degradation Reactions during Radical Functionalization of Polypropylene in the Melt", vol. 37, No. 22, Nov. 2, 2004, pp. 8414-8423.
Deng Changfu et al., "Grafting of Maleic Anhydride onto Hyperbranched Polyethylene and Suppression of Chain Degradation and Crosslinking Side Reactions", No. 5, 2008, pp. 435-441.
Liu et al., "Reactive Adsorption of Aminosilane onto the Glycidyl Methacrylate Graft-Copolymerized Poly (tetrafluoroethylene) Film Surface for Adhesion Enhancement with Evaporated Copper", Journal of Polymer Science: Part A Polymer Chemistry, vol. 38, No. 1, Jan. 2000, pp. 80-89.
English language abstract not available for JP H05-500686; however, see English language equivalent U.S. Pat. No. 5,918,641. Original document extracted from the espacenet.com and PAJ databases on Feb. 10, 2014, 14 pages.
English language abstract for JP S58-093704 extracted from the PAJ database on Feb. 10, 2014, 5 pages.
English language abstract for JP S62-135505 extracted from the espacenet.com database on Feb. 10, 2014, 7 pages.
English language abstract and machine-assisted English translation for JP 2002-037960 extracted from the PAJ database on Feb. 10, 2014, 55 pages.

\* cited by examiner

MODIFIED POLYOLEFINS

RELATED APPLICATIONS

This application is the National Stage of International Patent Application No. PCT/EP2010/070482, filed on Dec. 22, 2010 which claims priority to Great Britain Patent Application No. GB 1000121.2, filed on Jan. 6, 2010.

This invention relates to a process for grafting silane or silicone functionality onto a polyolefin, and to the graft polymers produced.

Polyolefins possess low polarity which is an important benefit for many applications. However, in some instances, the non-polar nature of polyolefins might be a disadvantage and limit their use in a variety of end-uses. For example due to their chemical inertness, functionalisation and crosslinking of polyolefins are difficult. The modification of polyolefin resins by grafting specific compound onto polymer backbone to improve properties is known. BE 652324 and U.S. Pat. No. 3,414,551 describe a process for reacting maleic anhydride with polypropylene. U.S. Pat. No. 3,873,643 describes the grafting of cyclic ethylenically unsaturated carboxylic acids and anhydrides onto polyethylene, under melt conditions and in presence of a peroxide.

JP59147035 describes a resin composition obtained by compounding (A) 100 pts.wt. of a polyolefin resin composition composed of (i) 40-94 wt %, preferably 53-91 wt % of a polyolefin (preferably propylene homopolymer, propylene-ethylene block copolymer or high-density polyethylene), (ii) 5-40 wt %, preferably 8-35 wt % of an inorganic filler (preferably talc, calcium carbonate, mica, etc.) and (iii) 1-20 wt %, preferably 1-12 wt % of a polybutadiene [preferably having a Mooney viscosity ML1+4 (100 deg. C.) of 20-60] with optionally (B) 0.1-10 pts.wt. of an unsaturated carboxylic acid (derivative) and/or 0.1-5 pts.wt.; of a silane coupling agent having ethylenic unsaturated bond and (C) 0.01-1 pt.wt. of a radical generator.

JP2007308653 describes a rubber composition for tire tread comprises (A) (A-1) 5-95 mass % of a modified conjugate diene polymer wherein active terminals of a conjugate diene polymer containing 75 mol % or more cis-1,4-bond content are modified at least by a hydrocarbiloxy silane compound, (A-2) a rubber component containing natural rubber and/or a diene type synthetic rubber, (B) 10-150 mass % of silica and (C) 0.2-8 mass % of a compound containing one or more group A reactive with the above rubber component and two or more group B adsorbing the above silane, the amounts of the components (B) and (C) being relative to 100 mass % of the component (A).

U.S. Pat. No. 3,646,155 describes crosslinking of polyolefins, particularly polyethylene, by reaction (grafting) of the polyolefin with an unsaturated hydrolysable silane at a temperature above 140° C. and in the presence of a compound capable of generating free radical sites in the polyolefin. Subsequent exposure of the reaction product to moisture and a silanol condensation catalyst effects crosslinking. This process has been extensively used commercially for crosslinking polyethylene. EP-B-809672, EP1942131, EP0276790, WO2007/14687, GB2134530, U.S. Pat. Nos. 6,864,323 and 7,041,744 are further examples of patents describing such grafting and crosslinking process. U.S. Pat. Nos. 6,177,519, 6,590,036, 6,380,316, 5,373,059, 5,929,127, and 6,590,039 all describe grafting other polyolefins and olefin copolymers with an unsaturated hydrolysable silane.

WO2009/073274 also describes hydrolysable silane graft propylene α-olefin copolymers prepared by grafting of a hydrolysable vinyl silane onto the olefin polymer. This patent suggests an alternative process of grafting a reactive organic monomer onto the olefin polymer and reacting with a functional silane. For example a maleic anhydride grafted olefin copolymer can be reacted with an aminosilane, as can an olefin copolymer grafted with glycidyl methacrylate.

A process according to the present invention for grafting silane or silicone functionality onto a polyolefin comprises reacting the polyolefin with an unsaturated monomer (A) containing an olefinic —C=C— bond or acetylenic —C≡C— bond and a reactive functional group X in the presence of means capable of generating free radical sites in the polyolefin and with an organosilicon compound (B) having a functional group Y which is reactive with the functional group X of the unsaturated monomer (A), characterized in that the unsaturated monomer (A) contains an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation of the unsaturated monomer (A).

The invention includes a composition comprising a polyolefin and unsaturated monomer (A) containing an olefinic —C=C— bond or acetylenic —C≡C— bond and a reactive functional group X, characterized in that the unsaturated monomer (A) contains an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation of the silane, and the composition contains an organosilicon compound (B) having a functional group Y which is reactive with the functional group X of the unsaturated monomer (A).

A process according to another aspect of the invention for grafting silane or silicone functionality onto a polyolefin comprises reacting the polyolefin with an unsaturated monomer (A') containing an olefinic —C=C— bond or acetylenic —C≡C— bond in the presence of means capable of generating free radical sites in the polyolefin and with an organosilicon compound (B) having a functional group Y which is reactive with the unsaturated monomer (A'), characterized in that the unsaturated monomer (A') contains at least two groups comprising an aromatic ring or a further olefinic double bond or acetylenic unsaturation conjugated with the olefinic —C=C— or acetylenic —C≡C— unsaturation of the unsaturated monomer (A'), and the functional group Y of the organosilicon compound (B) is capable of reacting with the olefinic or acetylenic bond present in the unsaturated monomer (A').

The invention includes the use of an unsaturated monomer (A) containing an olefinic —C=C— bond or acetylenic —C≡C— bond, an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation of the monomer, and a reactive functional group X, in conjunction with an organosilicon compound (B) having a functional group Y which is reactive with the functional group X of the unsaturated monomer (A), in grafting silane or silicone functionality onto a polyolefin, to give enhanced grafting and/or less degradation of the polymer compared to grafting with an unsaturated silane not containing an aromatic ring.

By an aromatic ring we mean any cyclic moiety which is unsaturated and which shows some aromatic character or π-bonding. The aromatic ring can be a carbocyclic ring such as a benzene or cyclopentadiene ring or a heterocyclic ring such as a furan, thiophene, pyrrole or pyridine ring, and can be a single ring or a fused ring system such as a naphthalene, quinoline or indole moiety.

Silane grafting, for example as described in the above listed patents, is efficient to functionalize and crosslink polyethylenes. However when trying to functionalize polypropylene using the above technologies, the grafting is accompanied by degradation of the polymer by chain scission in the β-position or so-called β-scission. We have found that a reactive monomer containing an olefinic —C═C— bond or acetylenic —C≡C— bond, an aromatic ring or a further olefinic double bond or acetylenic unsaturation, the aromatic ring or the further olefinic double bond or acetylenic unsaturation being conjugated with the olefinic —C═C— unsaturation or acetylenic —C≡C— unsaturation of the monomer, grafts efficiently to polypropylene, and to other polyolefins comprising at least 50% by weight units of an alpha-olefin having 3 to 10 carbon atoms, with minimised degradation by β-scission. The process of the present invention provides a high grafting efficiency while preventing chain scission with a single molecule. If a separate monomer is used to prevent chain scission, a competitive reaction may take place between grafting with the monomer used to prevent chain scission and grafting with the monomer used to introduce silane or siloxane groups onto the polyolefin, and hence the invention provides a more efficient reaction.

The polyolefin can for example be a polymer of an olefin having 2 to 10 carbon atoms, particularly of an alpha olefin of the formula $CH_2$═CHQ where Q is a hydrogen or a linear or branched alkyl group having 1 to 8 carbon atoms, and is in general a polymer containing at least 50 mole % units of an olefin having 2 to 10 carbon atoms. The process of the invention can be used to graft silane or silicone functionality to polyethylene and ethylene copolymers, but has particular advantages in preventing chain scission when grafting silane or silicone functionality to polyolefins comprising at least 50% by weight units of an alpha-olefin having 3 to 10 carbon atoms, such as polypropylene.

The polyolefin can for example be a polymer of ethene (ethylene), propene (propylene), butene or 2-methyl-propene-1 (isobutylene), hexene, heptene, octene, styrene. Propylene and ethylene polymers are an important class of polymers, particularly polypropylene and polyethylene. Polypropylene is a commodity polymer which is broadly available and of low cost. It has low density and is easily processed and versatile. Most commercially available polypropylene is isotactic polypropylene, but the process of the invention is applicable to atactic and syndiotactic polypropylene as well as to isotactic polypropylene. Isotactic polypropylene is prepared for example by polymerization of propene using a Ziegler-Natta catalyst or a metallocene catalyst. The invention can provide a crosslinked polypropylene of improved properties from commodity polypropylene. The polyethylene can for example be high density polyethylene of density 0.955 to 0.97 $g/cm^3$, medium density polyethylene (MDPE) of density 0.935 to 0.955 $g/cm^3$ or low density polyethylene (LDPE) of density 0.918 to 0.935 $g/cm^3$ including ultra low density polyethylene, high pressure low density polyethylene and low pressure low density polyethylene, or microporous polyethylene. The polyethylene can for example be produced using a Ziegler-Natta catalyst, a chromium catalyst or a metallocene catalyst. The polyolefin can alternatively be a polymer of a diene, such as a diene having 4 to 18 carbon atoms and at least one terminal double bond, for example butadiene or isoprene. The polyolefin can be a copolymer or terpolymer, for example a copolymer of propylene with ethylene or a copolymer of propylene or ethylene with an alpha-olefin having 4 to 18 carbon atoms, or of ethylene or propylene with an acrylic monomer such as acrylic acid, methacrylic acid, acrylonitrile, methacrylonitrile or an ester of acrylic or methacrylic acid and an alkyl or substituted alkyl group having 1 to 16 carbon atoms, for example ethyl acrylate, methyl acrylate or butyl acrylate, or a copolymer with vinyl acetate. The polyolefin can be a terpolymer for example a propylene ethylene diene terpolymer. Alternatively, the polyolefin can be a diene polymer such as polybutadiene, polyisoprene or a copolymer of butadiene with styrene, or a terpolymer of butadiene with ethylene and styrene or with acrylonitrile and styrene. The polyolefin can be heterophasic, for example a propylene ethylene block copolymer.

Examples of reactive groups X in the unsaturated monomer (A) are amino groups, which can be reacted with epoxide groups or isocyanate groups as reactive groups Y; hydroxyl groups, which can be reacted with isocyanate groups; epoxide groups, which can be reacted with amino groups or hydroxyl groups; aldehyde groups, which can be reacted with amino groups and isocyanate groups which can be reacted with amino groups or hydroxyl groups.

The unsaturated monomer (A) according to one embodiment contains an aromatic ring conjugated with the olefinic —C═C— or acetylenic —C≡C— unsaturation of the silane. The monomer (A) can for example have the formula $CH_2$═CH—$C_6H_4$-Q-X, wherein Q represents a direct bond or a spacer group. The monomer (A) can for example be a styrene derivative containing a reactive functional group X, such as 4-vinylaniline (4-aminostyrene), or a phenol containing unsaturation outside the aromatic ring such as 2-methoxy-4-vinylphenol.

In a preferred embodiment of the invention, the unsaturated monomer (A) contains an electron-withdrawing moiety with respect to the olefinic —C═C— or acetylenic —C≡C— bond. An electron-withdrawing moiety is a chemical group which draws electrons away from a reaction centre. The electron-withdrawing linkage can in general be any of the groups listed as dienophiles in Michael B. Smith and Jerry March; March's Advanced Organic Chemistry, $5^{th}$ edition, John Wiley & Sons, New York 2001, at Chapter 15-58 (page 1062), for example a C(═O)R*, C(═O)OR*, OC(═O)R*, C(═O) Ar or C(═O)—NH—R* linkage in which Ar represents arylene and R* represents a divalent hydrocarbon moiety.

Examples of unsaturated monomers (A) containing a reactive group X, an electron-withdrawing moiety with respect to the olefinic —CH═CH— bond and also containing an aromatic ring or a further olefinic double bond or acetylenic unsaturation, the aromatic ring or the further olefinic double bond or acetylenic unsaturation being conjugated with the olefinic —CH═CH— bond include sorbyl and sorbyloxy compounds containing the group $CH_3$—CH═CH—CH═CH—C(═O)— or $CH_3$—CH═CH—CH═CH—C(═O)O, for example sorbaldehyde

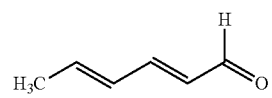

or a substituted alkyl sorbate ester such as glycidyl sorbate,

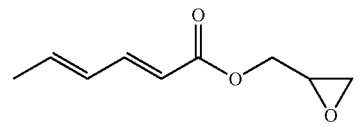

and cinnamyl compounds such as cinnamaldehyde.

The unsaturated compound (A') can for example be an ester of a polyhydric alcohol containing at least two groups of the formula R—CH═CH—CH═CH—Y—, where R represents hydrogen or a hydrocarbyl group having 1 to 12 carbon atoms and Y represents an organic linkage having an electron withdrawing effect with respect to the adjacent —CH═CH— bond. The polyhydric alcohol can be any polyhydric alcohol having 2 to 6 or more —OH groups, for example 3-(hydroxymethyl)pentane-1,5-diol (trimethylolpropane or TMP), pentaerythritol, propane-1,3-diol, propane-1,2-diol (propylene glycol), ethylene glycol, glycerol or sorbitol. A polyhydric alcohol having 3 or more —OH groups can be fully or partly esterified.

The unsaturated compound (A') can for example be a sorbate ester of a polyhydric alcohol, such as pentaerythritol trisorbate,

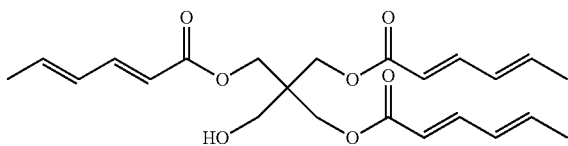 [SMILES: C/C=C/C=C/C(=O)OCC(CO)(COC(=O)/C=C/C=C/C)COC(=O)/C=C/C=C/C]

pentaerythritol tetrasorbate,

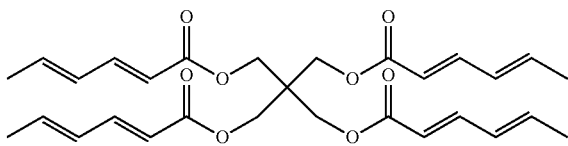 [SMILES: C/C=C/C=C/C(=O)OCC(COC(=O)/C=C/C=C/C)(COC(=O)/C=C/C=C/C)COC(=O)/C=C/C=C/C]

trimethylolpropane trisorbate,

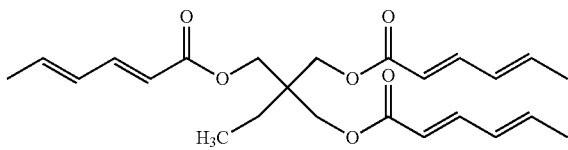 [SMILES: C/C=C/C=C/C(=O)OCC(CC)(COC(=O)/C=C/C=C/C)COC(=O)/C=C/C=C/C]

propane-1,2-diol disorbate or propane-1,3-diol disorbate,

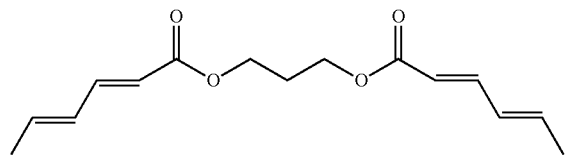 [SMILES: C/C=C/C=C/C(=O)OCCCOC(=O)/C=C/C=C/C]

or a cinnamate ester of a polyhydric alcohol, such as trimethylolpropane tricinnamate. The preparation of pentaerythritol tetrasorbate by acid catalyzed esterification is described in Example 4 of U.S. Pat. No. 3,458,460. Sorbates of other polyhydric alcohols can be prepared by the same technique.

The organosilicon compound (B) has a functional group Y which is chosen to be reactive with the functional group X of the unsaturated monomer (A) or with the olefinic or acetylenic bond present in the unsaturated monomer (A'). The functional group Y for reaction with the functional group X of the unsaturated monomer (A) can for example be an amino group to react with an aldehyde, epoxide or isocyanate group X from the unsaturated monomer (A), an epoxide group to react with an amino group X from the unsaturated monomer (A), or an isocyanate group to react with an amine or hydroxyl group X from the unsaturated monomer (A). The functional group Y is generally present in Y as a substituted alkyl group, for example an aminoalkyl group, such as:
—(CH$_2$)$_3$NH$_2$, —(CH$_2$)$_4$NH$_2$,
—(CH$_2$)$_3$NH(CH$_2$)$_2$NH$_2$,
—CH$_2$CH(CH$_3$)CH$_2$NH(CH$_2$)$_2$NH$_2$,
—(CH$_2$)$_3$NHCH$_2$CH$_2$NH(CH$_2$)$_2$NH$_2$,
—CH$_2$CH(CH$_3$)CH$_2$NH(CH$_2$)$_3$NH$_2$,
—(CH$_2$)$_3$NH(CH$_2$)$_4$NH$_2$ and
—(CH$_2$)$_3$O(CH$_2$)$_2$NH$_2$,
an epoxyalkyl group such as 3-glycidoxypropyl or
an isocyanatoalkyl group such as 3-isocyanatopropyl.

The organosilicon compound (B) for use with an unsaturated monomer (A') has a functional group Y which is reactive with the olefinic or acetylenic bond present in the group R"—CH═CH—Z' (III) or R"—C≡C—Z' (IV). The functional group Y can for example be reactive with the olefinic or acetylenic bond via Michael addition. Examples of functional groups Y which are reactive with an olefinic or acetylyenic bond via Michael addition include primary and secondary amine groups and mercato groups.

Examples of suitable organosilicon compounds (B) for use with an unsaturated monomer (A') thus include compounds having an aminoalkyl group, for example an aminoalkyl group as described above, or a mercaptoalkyl group bonded to a silicon atom.

The Michael addition reaction of primary amino groups or mercapto groups to an activated olefinic or acetylenic bond such as that present in the group R"—CH═CH—Z' (III) or R"—C≡C—Z' (IV), for example an acrylate ester group, proceeds readily at ambient temperature. It can be catalysed by strong acid or base or by Lewis acids but also proceeds readily without catalyst, as described by B. C. Ranu and S. Banerjee, *Tetrahedron Letters*, vol. 48, Iss. 1, pp. 141-143 (2007).

For many uses the organosilicon compound (B) is preferably a silane containing at least one hydrolysable group. Such hydrolysable silanes, when reacted onto a polyolefin grafted with the unsaturated monomer (A), can crosslink the polyolefin, for example by exposure of the reaction product to moisture and a silanol condensation catalyst. The hydrolysable group of the silane preferably has the formula —SiR$_a$R'$_{(3-a)}$ wherein R represents a hydrolysable group; R' represents a hydrocarbyl group having 1 to 6 carbon atoms; and a has a value in the range 1 to 3 inclusive. Each hydrolysable group R in the —SiR$_a$R'$_{(3-a)}$ group is preferably an alkoxy group, although alternative hydrolysable groups such as acyloxy, for example acetoxy, ketoxime, for example methylethylketoxime, alkyllactato, for example ethyllactato, amido, aminoxy or alkenyloxy groups can be used provided that they do not react with the functional groups X of unsaturated monomer (A). Alkoxy groups R generally each have a linear or branched alkyl chain of 1 to 6 carbon atoms and most preferably are methoxy or ethoxy groups. The value of a can for example be 3, for example the silane can be a trimethoxy silane, to give the maximum number of crosslinking sites. However each alkoxy group generates a volatile organic alcohol when it is hydrolysed, and it may be preferred that the value of a is 2 or even 1 to minimize the volatile organic material emitted during crosslinking. The group R' if present is preferably a methyl or ethyl group.

The silane used as organosilicon compound (B) can be partially hydrolysed and condensed into oligomers containing siloxane linkages. Usually it is preferred that such oligomers still contain at least one hydrolysable group bonded to Si per unsaturated silane monomer unit, so that the graft polymer has sufficient reactivity towards itself and towards polar surfaces and materials. If the grafted polymer is to be crosslinked, it is usually preferred that hydrolysis of the silane before grafting should be minimized.

Examples of preferred amino functional hydrolysable silanes include 3-aminopropyltriethoxysilane, aminopropyltrimethoxysilane and 2-methyl-3-aminopropyltrimethoxysilane, which can for example be reacted with polyolefin grafted with epoxide groups derived from glycidyl sorbate, aldehyde groups derived from sorbaldehyde or isocyanate groups. Examples of preferred epoxide functional hydrolysable silanes include 3-glycidoxypropyltrimethoxysilane and 3-glycidoxypropyltriethoxysilane, which can for example be reacted with polyolefin grafted with amino groups derived from 4-vinylaniline. Examples of preferred isocyanate functional hydrolysable silanes include 3-isocyanatopropyltriethoxysilane and 3-isocyanatopropyltrimethoxysilane, which can for example be reacted with polyolefin grafted with amino groups derived from 4-vinylaniline or alcoholic or phenolic hydroxyl groups derived for example from 2-methoxy-4-vinylphenol.

The organosilicon compound (B) can alternatively be a polyorganosiloxane. Polyorganosiloxanes, also known as silicones, generally comprise siloxane units selected from $R_3SiO_{1/2}$ (M units), $R_2SiO_{2/2}$ (D units), $RSiO_{3/2}$ (T units) and $SiO_{4/2}$ (Q units), in which each R represents an organic group or hydrogen or a hydroxyl group.

The organosilicon compound (B) can for example be a branched silicone resin containing T and/or Q units, optionally in combination with M and/or D units. Branched silicone resins can for example be prepared by the hydrolysis and condensation of hydrolysable silanes such as alkoxysilanes. Trialkoxysilanes such as alkyltrialkoxysilanes generally lead to T units in the silicone resin and tetraalkoxysilanes generally lead to Q units. Branched silicone resins comprising T units containing a reactive group Y can be formed by hydrolysis and condensation of trialkoxysilanes containing aminoalkyl, epoxyalkyl or isocyanatoalkyl groups, for example the trialkoxysilanes described above. The branched silicone resin can for example comprise mainly or predominantly T units, in which case 0.1 to 100 mole % of the siloxane T units present may contain the reactive group Y. The branched silicone resin can alternatively be a MQ resin in which most of the siloxane units present in the branched silicone resin are selected from Q units and M units. Reactive groups Y can be introduced by reacting a trialkoxysilane containing aminoalkyl, epoxyalkyl or isocyanatoalkyl group with a monoalkoxysilane such as trimethylmethoxysilane and a tetraalkoxysilane such as tetraalkoxysilane, introducing some T units containing reactive groups Y into the MQ resin.

An alternative polyorganosiloxane suitable as organosilicon compound (B) is a substantially linear organopolysiloxane in which at least 50 mole % of the siloxane units are D units, for example polydimethylsiloxane, comprising at least one group containing a reactive group Y. The linear organopolysiloxane can for example contain aminoalkyl, epoxyalkyl or isocyanatoalkyl groups either as terminal groups or as groups pendant to the polydiorganosiloxane chain. Reaction with the polyolefin and the unsaturated compound (A) in the presence of means capable of generating free radical sites in the polyolefin can form a polyolefin polydiorganosiloxane blend stabilised by grafting of the polydiorganosiloxane to the polyolefin through grafted units of unsaturated compound (A).

Grafting of the unsaturated monomer (A), or its reaction product with the organosilicon compound (B), to the polyolefin to an extent that improves the properties of the polyolefin, generally requires means capable of generating free radical sites in the polyolefin. The means for generating free radical sites in the polyolefin preferably comprises a compound capable of generating free radicals, and thus capable of generating free radical sites in the polyolefin. Other means include applying shear, heat or irradiation such as electron beam radiation. The high temperature and high shear rate generated by a melt extrusion process can generate free radical sites in the polyolefin.

The compound capable of generating free radical sites in the polyolefin is preferably an organic peroxide, although other free radical initiators such as azo compounds can be used. Preferably the radical formed by the decomposition of the free-radical initiator is an oxygen-based free radical. It is more preferable to use hydroperoxides, carboxylic peroxyesters, peroxyketals, dialkyl peroxides and diacyl peroxides, ketone peroxides, diaryl peroxides, aryl-alkyl peroxides, peroxydi carbonates, peroxyacids, acyl alkyl sulfonyl peroxides and monoperoxydicarbonates. Examples of preferred peroxides include dicumyl peroxide, 2,5-dimethyl-2,5-di-(tert-butylperoxy)hexane, di-tert-butyl peroxide, 2,5-dimethyl-2,5-di-(tert-butylperoxy)hexyne-3,3,6,9-triethyl-3,6,9-trimethyl-1,4,7-triperoxonane, benzoyl peroxide, 2,4-dichlorobenzoyl peroxide, tert-butyl peroxyacetate, tert-butyl peroxybenzoate, tert-amylperoxy-2-ethylhexyl carbonate, tert-butylperoxy-3,5,5-trimethylhexanoate, 2,2-di (tert-butylperoxy)butane, tert-butylperoxy isopropyl carbonate, tert-buylperoxy-2-ethylhexyl carbonate, butyl 4,4-di (tert-buylperoxy)valerate, di-tert-amyl peroxide, tert-butyl peroxy pivalate, tert-butyl-peroxy-2-ethyl hexanoate, di(tert-butylperoxy)cyclohexane, tertbutylperoxy-3,5,5-trimethyl-hexanoate, di(tertbutylperoxyisopropyl)benzene, cumene hydroperoxide, tert-butyl peroctoate, methyl ethyl ketone peroxide, tert-butyl α-cumyl peroxide, 2,5-dimethyl-2,5-di (peroxybenzoate)hexyne-3, 1,3- or 1,4-bis(t-butylperoxyisopropyl)benzene, lauroyl peroxide, tert-butyl peracetate, and tert-butyl perbenzoate. Examples of azo compounds are azobisisobutyronitrile and dimethylazodiisobutyrate. The above radical initiators can be used alone or in combination of at least two of them.

The temperature at which the polyolefin and the unsaturated monomer (A) are reacted in the presence of the compound capable of generating free radical sites in the polyolefin is generally above 120° C., usually above 140° C., and is sufficiently high to melt the polyolefin and to decompose the free radical initiator. For polypropylene and polyethylene, a temperature in the range 170° C. to 220° C. is usually preferred. The peroxide or other compound capable of generating free radical sites in the polyolefin preferably has a decomposition temperature in a range between 120-220° C., most preferably between 160-190° C.

The compound capable of generating free radical sites in the polyolefin is generally present in an amount of at least 0.01% by weight of the total composition and can be present in an amount of up to 5 or 10%. An organic peroxide, for example, is preferably present at 0.01 to 2% by weight based on the polyolefin during the grafting reaction. Most preferably, the organic peroxide is present at 0.01% to 0.5% by weight of the total composition.

The means for generating free radical sites in the polyolefin can alternatively be an electron beam. If electron beam is used, there is no need for a compound such as a peroxide capable of generating free radicals. The polyolefin is irradiated with an electron beam having an energy of at least 5 MeV in the presence of the unsaturated silane (I) or (II). Preferably, the accelerating potential or energy of the electron beam is between 5 MeV and 100 MeV, more preferably from 10 to 25 MeV. The power of the electron beam generator is preferably from 50 to 500 kW, more preferably from 120 to 250 kW. The radiation dose to which the polyolefin/grafting agent mixture is subjected is preferably from 0.5 to 10 Mrad. A mixture of polyolefin and the branched silicone resin can be deposited onto a continuously moving conveyor such as an endless belt, which passes under an electron beam generator which irradiates the mixture. The conveyor speed is adjusted in order to achieve the desired irradiation dose.

The means for generating free radical sites in the polyolefin can alternatively be a combination of high temperature and high shear rate. For example the temperature and shear rate generated by a melt extrusion process can generate some free radicals in the polyolefin, leading to grafting, although a higher level of grafting is achieved if peroxide is present.

The process of the invention can be carried out in different procedures. In one preferred procedure the polyolefin is reacted simultaneously with the unsaturated monomer (A) and the organosilicon compound (B) in the presence of means capable of generating free radical sites in the polymer. Grafting of the unsaturated monomer (A) takes place simultaneously with reaction of the reactive groups X of (A) with the reactive groups Y of organosilicon compound (B). A grafted polyolefin containing silane or silicone moieties derived from the organosilicon compound (B) is produced. If the organosilicon compound (B) contains hydrolysable groups, the grafted polymer will contain hydrolysable groups. This process has the advantage of grafting the unsaturated monomer (A) and the organosilicon compound (B) in a single step process.

Alternatively the process of the invention can be carried out by sequential steps. The polyolefin is reacted with the unsaturated monomer (A) in the presence of means capable of generating free radical sites in the polymer and the reaction product is reacted with the organosilicon compound (B). Alternatively the process of the invention can be carried out by reacting unsaturated monomer (A) with the organosilicon compound (B) and the reaction product thereof is then reacted with the polyolefin in the presence of a means capable of generating free radical sites in the polyolefin.

If the organosilicon compound (B) contains hydrolysable groups, for example if (B) is a silane containing Si-bonded alkoxy groups and the grafted polymer thus contains hydrolysable groups, these can react in the presence of moisture with hydroxyl groups present on the surface of many fillers and substrates, for example of minerals and natural products. The moisture can be ambient moisture or a hydrated salt can be added. Grafting of the polyolefin with an organosilicon compound (B) according to the invention can be used to improve compatibility of the polyolefin with fillers. The polyolefin grafted with hydrolysable groups can be used as a coupling agent improving filler/polymer adhesion; for example polypropylene grafted according to the invention can be used as a coupling agent for unmodified polypropylene in filled compositions. The polyolefin grafted with hydrolysable groups can be used as an adhesion promoter or adhesion interlayer improving the adhesion of a low polarity polymer such as polypropylene to surfaces. The hydrolysable groups can also react with each other in the presence of moisture to form Si—O—Si linkages between polymer chains.

The hydrolysable groups, for example silyl-alkoxy groups, react with each other in the presence of moisture to form Si—O—Si linkages between polymer chains even at ambient temperature, without catalyst, but the reaction proceeds much more rapidly in the presence of a siloxane condensation catalyst. Thus the grafted polymer can be crosslinked by exposure to moisture in the presence of a silanol condensation catalyst. The grafted polymer can be foamed by adding a blowing agent, moisture and condensation catalyst. Any suitable condensation catalyst may be utilised. These include protic acids, Lewis acids, organic and inorganic bases, transition metal compounds, metal salts and organometallic complexes.

Preferred catalysts include organic tin compounds, particularly organotin salts and especially diorganotin dicarboxylate compounds such as dibutyltin dilaurate, dioctyltin dilaurate, dimethyltin dibutyrate, dibutyltin dimethoxide, dibutyltin diacetate, dimethyltin bisneodecanoate, dibutyltin dibenzoate, dimethyltin dineodeconoate or dibutyltin dioctoate. Alternative organic tin catalysts include triethyltin tartrate, stannous octoate, tin oleate, tin naphthate, butyltintri-2-ethylhexoate, tin butyrate, carbomethoxyphenyl tin trisuberate and isobutyltin triceroate. Organic compounds, particularly carboxylates, of other metals such as lead, antimony, iron, cadmium, barium, manganese, zinc, chromium, cobalt, nickel, aluminium, gallium or germanium can alternatively be used.

The condensation catalyst can alternatively be a compound of a transition metal selected from titanium, zirconium and hafnium, for example titanium alkoxides, otherwise known as titanate esters of the general formula $Ti[OR^5]_4$ and/or zirconate esters $Zr[OR^5]_4$ where each $R^5$ may be the same or different and represents a monovalent, primary, secondary or tertiary aliphatic hydrocarbon group which may be linear or branched containing from 1 to 10 carbon atoms. Preferred examples of $R^5$ include isopropyl, tertiary butyl and a branched secondary alkyl group such as 2,4-dimethyl-3-pentyl. Alternatively, the titanate may be chelated with any suitable chelating agent such as acetylacetone or methyl or ethyl acetoacetate, for example diisopropyl bis(acetylacetonyl)titanate or diisopropyl bis(ethylacetoacetyl)titanate.

The condensation catalyst can alternatively be a protonic acid catalyst or a Lewis acid catalyst. Examples of suitable protonic acid catalysts include carboxylic acids such as acetic acid and sulphonic acids, particularly aryl sulphonic acids such as dodecylbenzenesulphonic acid. A "Lewis acid" is any substance that will take up an electron pair to form a covalent bond, for example, boron trifluoride, boron trifluoride monoethylamine complex, boron trifluoride methanol complex, $FeCl_3$, $AlCl_3$, $ZnCl_2$, $ZnBr_2$ or catalysts of formula $MR^4_fX_g$ where M is B, Al, Ga, In or Tl, each $R^4$ is independently the same or different and represents a monovalent aromatic hydrocarbon radical having from 6 to 14 carbon atoms, such monovalent aromatic hydrocarbon radicals preferably having at least one electron-withdrawing element or group such as —$CF_3$, —$NO_2$ or —CN, or substituted with at least two halogen atoms; X is a halogen atom; f is 1, 2, or 3; and g is 0, 1 or 2; with the proviso that f+g=3. One example of such a catalyst is $B(C_6F_5)_3$.

An example of a base catalyst is an amine or a quaternary ammonium compound such as tetramethylammonium hydroxide, or an aminosilane. Amine catalysts such as laurylamine can be used alone or can be used in conjunction with another catalyst such as a tin carboxylate or organotin carboxylate.

The silane condensation catalyst is typically used at 0.005 to 1.0 by weight of the total composition. For example a diorganotin dicarboxylate is preferably used at 0.01 to 0.1% by weight of the total composition.

The polyolefin composition can contain one or more organic or inorganic fillers and/or fibres. According to one aspect of the invention grafting of the polyolefin can be used to improve compatibility of the polyolefin with fillers and fibrous reinforcements. Improved compatibility of a polyolefin such as polypropylene with fillers or fibres can give filled polymer compositions having improved properties whether or not the grafted polyolefin is subsequently crosslinked optionally using a silanol condensation catalyst. Such improved properties can for example be improved physical properties derived from reinforcing fillers or fibres, or other properties derived from the filler such as improved coloration by pigments. The fillers and/or fibres can conveniently be mixed into the polyolefin with the unsaturated monomer (A), the organosilicon compound (B) and the organic peroxide during the grafting reaction, or can be mixed with the grafted polymer subsequently.

When forming a filled polymer composition, the grafted polymer can be the only polymer in the composition or can be used as a coupling agent in a filled polymer composition also comprising a low polarity polymer such as an unmodified polyolefin. The grafted polymer can thus be from 1 or 10% by weight up to 100% of the polymer content of the filled composition. Moisture and optionally silanol condensation catalyst can be added to the composition to promote bonding between filler and grafted polymer. Preferably the grafted polymer can be from 2% up to 10% of the total weight of the filled polymer composition.

Examples of mineral fillers or pigments which can be incorporated in the grafted polymer include titanium dioxide, aluminium trihydroxide, magnesium dihydroxide, mica, kaolin, calcium carbonate, non-hydrated, partially hydrated, or hydrated fluorides, chlorides, bromides, iodides, chromates, carbonates, hydroxides, phosphates, hydrogen phosphates, nitrates, oxides, and sulphates of sodium, potassium, magnesium, calcium, and barium; zinc oxide, aluminium oxide, antimony pentoxide, antimony trioxide, beryllium oxide, chromium oxide, iron oxide, lithopone, boric acid or a borate salt such as zinc borate, barium metaborate or aluminium borate, mixed metal oxides such as aluminosilicate, vermiculite, silica including fumed silica, fused silica, precipitated silica, quartz, sand, and silica gel; rice hull ash, ceramic and glass beads, zeolites, metals such as aluminium flakes or powder, bronze powder, copper, gold, molybdenum, nickel, silver powder or flakes, stainless steel powder, tungsten, hydrous calcium silicate, barium titanate, silica-carbon black composite, functionalized carbon nanotubes, cement, fly ash, slate flour, bentonite, clay, talc, anthracite, apatite, attapulgite, boron nitride, cristobalite, diatomaceous earth, dolomite, ferrite, feldspar, graphite, calcined kaolin, molybdenum disulfide, perlite, pumice, pyrophyllite, sepiolite, zinc stannate, zinc sulfide or wollastonite. Examples of fibres include natural fibres such as wood flour, wood fibres, cotton fibres, cellulosic fibres or agricultural fibres such as wheat straw, hemp, flax, kenaf, kapok, jute, ramie, sisal, henequen, corn fibre or coir, or nut shells or rice hulls, or synthetic fibres such as polyester fibres, aramid fibres, nylon fibres, or glass fibres. Examples of organic fillers include lignin, starch or cellulose and cellulose-containing products, or plastic microspheres of polytetrafluoroethylene or polyethylene. The filler can be a solid organic pigment such as those incorporating azo, indigoid, triphenylmethane, anthraquinone, hydroquinone or xanthine dyes.

The concentration of filler or pigment in such filled compositions can vary widely; for example the filler or pigment can form from 1 or 2% up to 70% by weight of the total composition.

The grafted polyolefin of the invention can also be used to improve the compatibility of a low polarity polymer such as polypropylene with a polar polymer. The composition comprising the low polarity polymer, polar polymer and grafted polyolefin can be filled and/or fibre-reinforced or unfilled.

The grafted polyolefin of the present invention can also be used for increasing the surface energy of polyolefins for further improving the coupling or adhesion of polyolefin based materials with higher surface energy polymers typically used in inks, paints, adhesives and coatings, e.g., epoxy, polyurethanes, acrylics and silicones.

When forming a crosslinked polyolefin article by grafting of an unsaturated monomer (A) and reaction with an organosilicon compound (B) containing hydrolysable groups either simultaneously or subsequently and crosslinking by moisture, the grafted polymer is preferably shaped into an article and subsequently crosslinked by moisture. In one preferred procedure, a silanol condensation catalyst can be dissolved in the water used to crosslink the grafted polymer. For example an article shaped from grafted polyolefin can be cured by water containing a carboxylic acid catalyst such as acetic acid, or containing any other common catalyst capable of accelerating the hydrolysis and condensation reactions of alkoxy-silyl groups. However, crosslinking may also take place in absence of such catalyst.

Alternatively or additionally, the silanol condensation catalyst can be incorporated into the grafted polymer before the grafted polymer is shaped into an article. The shaped article can subsequently be crosslinked by moisture. The catalyst can be mixed with the polyolefin before, during or after the grafting reaction.

In one preferred procedure, the polyolefin, the unsaturated monomer (A), the organosilicon compound (B) containing hydrolysable groups, and the compound capable of generating free radical sites in the polyolefin are mixed together at above 120° C. in a twin screw extruder to graft the unsaturated monomer (A) reacted with the organosilicon compound (B) to the polymer, and the resulting grafted polymer is mixed with the silanol condensation catalyst in a subsequent mixing step. Mixing with the catalyst can for example be carried out continuously in an extruder, which can be an extruder adapted to knead or compound the materials passing through it such as a twin screw extruder as described above or can be a more simple extruder such as a single screw extruder. Since the grafted polymer is heated in such a second extruder to a temperature above the melting point of the polyolefin, the grafting reaction may continue in the second extruder.

In an alternative preferred procedure, the silanol condensation catalyst can be premixed with part of the polyolefin and the unsaturated monomer (A), the organosilicon compound (B) and the peroxide capable of generating free radical sites in the polymer can be premixed with a different portion of the polyolefin, and the two premixes can be contacted, optionally with further polyolefin, in the mixer or extruder used to carry out the grafting reaction. Since the preferred condensation catalysts such as diorganotin dicarboxylates are liquids, it may be preferred to absorb them on a microporous polyolefin before mixing with the bulk of the polypropylene or other polyolefin in an extruder.

For many uses the grafted polyolefin composition preferably contains at least one antioxidant. Examples of suitable antioxidants include tris(2,4-di-tert-butylphenyl)phosphite sold commercially under the trade mark Ciba Irgafos® 168, tetrakis [methylene-3-(3,5-di-tert-butyl-4-hydroxyphenyl-propionate)] methane processing stabilizer sold commercially under the trade mark Ciba Irganox® 1010 and 1.3.5-trimethyl-2.4.6-tris(3.5-di-tert-butyl-4-hydroxy benzyl) benzene sold commercially under the trade mark Ciba Irganox® 1330. It may also be desired that the crosslinked polymer contains a stabiliser against ultraviolet radiation and light radiation, for example a hindered amine light stabiliser such as a 4-substituted-1,2,2,6,6-pentamethylpiperidine, for example those sold under the trademarks Tinuvin® 770, Tinuvin® 622, Uvasil® 299, Chimassorb® 944 and Chimassorb® 119. The antioxidant and/or hindered amine light stabiliser can conveniently be incorporated in the polyolefin either with the unsaturated silane and the organic peroxide during the grafting reaction or with the silanol condensation catalyst if this is added to the grafted polymer in a separate subsequent step. The total concentration of antioxidants and light stabilisers in the crosslinked polyolefin is typically in the range 0.02 to 0.15% by weight of the total composition.

The grafted polyolefin composition or of the invention can also contain other additives such as dyes or processing aids.

The polymer compositions of the invention, particularly filled grafted polyolefin compositions and/or crosslinked polyolefins, can be used in a wide variety of products. The grafted polymer can be blow moulded or rotomoulded to form bottles, cans or other liquid containers, liquid feeding parts, air ducting parts, tanks, including fuel tanks, corrugated bellows, covers, cases, tubes, pipes, pipe connectors or transport trunks. The grafted polymer can be extruded to form pipes, corrugated pipes, sheets, fibres, plates, coatings, film, including shrink wrap film, profiles, flooring, tubes, conduits or sleeves, or extruded onto wire or cable as an electrical insulation layer. The grafted polymer can be injection moulded to form tube and pipe connectors, packaging, gaskets and panels. The grafted polymer can also be foamed or thermoformed. If the silicon compound (B) contains hydrolysable groups, in each case the shaped article can be crosslinked by exposure to moisture in the presence of a silanol condensation catalyst.

Crosslinked polyolefin articles produced according to the invention have improved mechanical strength, heat resistance, chemical and oil resistance, creep resistance, scratch resistance, flame retardancy and/or environmental stress cracking resistance compared to articles formed from the same polyolefin without grafting or crosslinking.

The invention preferably encompasses a process characterised in that the polyolefin is reacted simultaneously with the unsaturated monomer (A) and the organosilicon compound (B) in the presence of means capable of generating free radical sites in the polyolefin.

The invention provides a composition comprising a polyolefin and unsaturated monomer (A) containing an olefinic —C=C— bond or acetylenic —C≡C— bond and a reactive functional group X, characterized in that the unsaturated monomer (A) contains an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation of the silane, and the composition contains an organosilicon compound (B) having a functional group Y which is reactive with the functional group X of the unsaturated monomer (A).

Preferably, the polyolefin comprises at least 50% by weight units of an alpha-olefin having 3 to 10 carbon atoms.

Preferably, the polyolefin is polypropylene.

Preferably, the unsaturated monomer (A) is 4-vinylaniline and the silicon compound (B) contains an epoxide or isocyanate group.

Preferably, the unsaturated monomer (A) is 2-methoxy-4-vinylphenol and the silicon compound (B) contains an isocyanate group.

Preferably, the unsaturated monomer (A) contains an electron-withdrawing moiety with respect to the olefinic —C=C— or acetylenic —C≡C— bond.

Preferably, the unsaturated monomer (A) is sorbaldehyde and the organosilicon compound (B) contains an aminoalkyl group.

Preferably, the unsaturated monomer (A) is glycidyl sorbate and the organosilicon compound (B) contains an aminoalkyl group.

Preferably, the unsaturated monomer (A) is present at 0.5 to 20.0% by weight based on the polyolefin.

Preferably, the organosilicon compound (B) is a silane containing the functional group Y and a hydrolysable group.

Preferably, hydrolysable group is of the formula —SiRaR' (3-a) wherein each R represents an alkoxy group having 1 to 4 carbon atoms; R' represents a hydrocarbyl group having 1 to 6 carbon atoms; and a has a value in the range 1 to 3 inclusive.

Preferably, the unsaturated silane is partially hydrolyzed and condensed into oligomers.

Preferably, the organosilicon compound (B) is a branched silicone resin containing T units of the formula Y—Z—SiO3/2 wherein Z is a divalent organic linkage bonded to the branched silicone resin through a C—Si bond.

Preferably, the branched silicone resin contains hydrolysable Si—OR groups, in which R represents an alkyl group having 1 to 4 carbon atoms.

Preferably, the organosilicon compound (B) is a mainly linear organopolysiloxane fluid containing at least one group of the formula Y—Z'— wherein Z' is a divalent organic linkage bonded to the organopolysiloxane fluid.

Preferably, the organopolysiloxane fluid is polydimethylsiloxane having at least one terminal group of the formula Y—Z'— wherein Z' is a divalent organic linkage bonded to the organopolysiloxane fluid.

Preferably, the divalent organic linkage Z' is bonded to the organopolysiloxane fluid through a C—Si bond.

Preferably, an organic peroxide compound capable of generating free radical sites in the polyolefin is present at 0.01 to 2% by weight of the polyolefin during reaction with the unsaturated monomer (A).

Preferably, the polyolefin is reacted with the unsaturated monomer (A) in the presence of means capable of generating free radical sites in the polyolefin and the reaction product is reacted with the organosilicon compound (B).

Preferably, the unsaturated monomer (A) is reacted with the organosilicon compound (B) and the reaction product is reacted with the polyolefin in the presence of means capable of generating free radical sites in the polyolefin.

The invention provides a process for grafting silane or silicone functionality onto a polyolefin, comprising reacting the polyolefin with an unsaturated monomer (A') containing an olefinic —C=C— bond or acetylenic —C≡C— bond in the presence of means capable of generating free radical sites in the polyolefin and with an organosilicon compound (B) having a functional group Y which is reactive with the unsaturated monomer (A'), characterized in that the unsaturated monomer (A') contains at least two groups comprising an aromatic ring or a further olefinic double bond or acetylenic unsaturation conjugated with the olefinic —C=C— or acetylenic —C≡C— unsaturation of the unsaturated monomer (A'), and the functional group Y of the organosilicon compound (B) is capable of reacting with the olefinic or acetylenic bond present in the unsaturated monomer (A').

Preferably, the polyolefin is reacted simultaneously with the unsaturated monomer (A') and the organosilicon compound (B) in the presence of means capable of generating free radical sites in the polyolefin.

Preferably, the polyolefin is reacted with the unsaturated monomer (A') in the presence of means capable of generating free radical sites in the polyolefin and the reaction product is reacted with the organosilicon compound (B).

Preferably, the unsaturated monomer (A') is reacted with the organosilicon compound (B) and the reaction product is reacted with the polyolefin in the presence of means capable of generating free radical sites in the polyolefin.

The invention provides a composition comprising a polyolefin and unsaturated monomer (A') containing an olefinic —C=C— bond or acetylenic —C≡C— bond, characterised in that the unsaturated monomer (A') contains at least two groups comprising an aromatic ring or a further olefinic double bond or acetylenic unsaturation conjugated with the olefinic —C=C— or acetylenic —C≡C— unsaturation of the unsaturated monomer (A'), and the composition contains an organosilicon compound (B) having a functional group Y which is capable of reacting with the olefinic or acetylenic bond present in the unsaturated monomer (A').

Preferably, the polyolefin comprises at least 50% by weight units of an alpha-olefin having 3 to 10 carbon atoms.

More preferably, the polyolefin is polypropylene.

The invention encompasses the use of an unsaturated monomer (A) containing an olefinic —C=C— bond or acetylenic —C≡C— bond, an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation of the monomer, and a reactive functional group X, in conjunction with an organosilicon compound (B) having a functional group Y which is reactive with the functional group X of the unsaturated monomer (A), in grafting silane or silicone functionality onto a polyolefin, to give enhanced grafting and/or less degradation of the polymer compared to grafting with an unsaturated silane not containing an aromatic ring.

The invention is illustrated by the following Examples.

Raw Materials

The polymers used were:
PP=Isotactic polypropylene homopolymer supplied as Borealis® HB 205 TF (melt flow index MFR 1 g/10 min at 230° C./2.16 kg measured according to ISO 1133);
Porous PP was microporous polypropylene supplied by Membrana as Accurel® XP100. This microporous polymer was used for absorbing liquid ingredients. Characteristics of Accurel® XP100 are MFR (2.16 kg/230° C.) 2.1 g/10 min (method ISO1133), and melting temperature (DSC) 156° C.

The peroxide used is:
DHBP was 2,5-dimethyl-2,5-di-(tert-butylperoxy)hexaneperoxide supplied as Arkema Luperox® 101 peroxide;

The silanes used as silicon compound (B) are:
Z-6011 was aminopropyl-triethoxysilane 99% pure as Dow Corning® Z6011.
Z-6040 was 3-glycidoxypropyltrimethoxysilane 99% pure as Dow Corning® Z6040.
3-Isocyanatopropyltriethoxysilane was 95% pure supplied by ABCR GmbH & Co. KG (ref. AB111201);
3-Isocyanatopropyltrimethoxysilane was ≥95% pure supplied by ABCR GmbH & Co. KG (ref. AB143694).

Unsaturated monomers (A) were:
4-vinylaniline was 97% pure supplied by Sigma-Aldrich Reagent Plus® (ref. 536180).

2-Methoxy-4-vinylphenol was ≥98% pure supplied by Sigma-Aldrich Reagent Plus® (ref. W267511).
Sorbaldehyde (trans,trans-2,4-Hexadienal) was 95% pure supplied by Sigma-Aldrich Reagent Plus® (ref. W342904).
3-glycidyl sorbate was prepared by the process described in patent CA-526630.

Condensation catalysts used were:
1% acetic acid diluted into water for curing moulded or injected specimens underwater;
Dioctyltindilaurate (DOTDL) supplied by ABCR® (ref. AB106609) diluted into Naphthenic processing oil Nyflex® 222B sold by Nynas with a viscosity of 104 cSt (40° C., method ASTM D445) and specific gravity 0.892 g/cm3 (method ASTM D4052) for compounding into the composite material Anti-oxidants used were:
Irgafos 168 was tris-(2,4-di-tert-butylphenyl)phosphite antioxidant supplied by Ciba as Irgafos® 168
Irganox® 1010 was tetrakis [methylene-3-(3,5-di-tert-butyl-4-hydroxyphenyl-propionate)] methane phenolic antioxidant supplied by Ciba as Irganox® 1010.

EXAMPLE 1

10 parts by weight porous PP pellets were tumbled with 3.36 parts by weight Aminopropyl-triethoxysilane, 1.46 parts by weight sorbaldehyde and 0.2 parts DHBP until the liquid reagents were absorbed by the polypropylene to form a silane masterbatch.

100 parts by weight Borealis® HB 205 TF polypropylene pellets were loaded in a Brabender® Plastograph 350E mixer equipped with roller blades, in which compounding was carried out. Filling ratio was set to 0.7. Rotation speed was 50 rpm, and the temperature of the chamber was maintained at 190° C. Torque and temperature of the melt were monitored for controlling the reactive processing of the ingredients. The PP was loaded in three portions allowing 1 minute fusion/mixing after each addition. The silane masterbatch was then added and mixed for 4 minutes to start the grafting reaction. 0.5 parts Irganox® 1010 and 0.5 parts Irgafos® 168 antioxidants were then added and mixed for a further 1 minute during which grafting continued. The melt was then dropped from the mixer and cooled down to ambient temperature. The resulting grafted polypropylene was moulded into 2 mm thick sheet on an Agila® PE30 press at 210° C. for 5 minutes before cooling down to ambient temperature at 15° C./min with further pressing.

Samples of the 2 mm sheet were cured at 90° C. for 24 hours in a water bath containing 1% acetic acid as a catalyst.

EXAMPLE 2

Example 1 was repeated replacing sorbaldehyde by an equimolar amount of 4-vinylaniline and replacing aminopropyl-triethoxysilane by an equivalent amount of 3-glycidoxypropyltrimethoxysilane.

EXAMPLE 3

Example 1 was repeated replacing sorbaldehyde by an equimolar amount of 2-methoxy-4-vinylphenol and replacing aminopropyl-triethoxysilane by an equivalent amount of 3-isocyanatopropyltriethoxysilane

EXAMPLES 4 AND 5

Example 2 was repeated replacing 3-glycidoxypropyltrimethoxysilane by an equivalent amount of either 3-isocyanatopropyltriethoxysilane or 3-isocyanatopropyltrimethoxysilane as shown in Table 1.

EXAMPLE 6

Example 1 was repeated replacing sorbaldehyde by an equimolar amount of glycidyl sorbate.

COMPARATIVE EXAMPLES C1 AND C2

In Comparative example C1, Example 1 was repeated with the omission of the Sorbaldehyde and the Z-6011. In Comparative Example C2, the Sorbaldehyde and the Z-6011 and the peroxide were omitted.

For each Example, the torque during compounding and the elastic shear modulus G' of the crosslinked polypropylene after 24 hours curing were measured. These are recorded in Table 1.

The processing torque is the measure of the torque in Newton*meter (N.m) applied by the motor of the Plastograph 350E mixer to maintain the mixing speed of 50 rpm. The value reported is the one of the torque level plateau at the end of the mixing.

The lower the torque, the lower the polymer viscosity. The torque level at the end of mixing stage is therefore an image of polymer degradation during mixing.

Elastic shear modulus (G') measurements were carried out on the Advanced Polymer Analyzer APA2000®. 3.5 g specimens were analyzed above their melting point, at temperature of 210° C. Elastic shear modulus (G') was recorded upon strain sweep under constant oscillating conditions (0.5 Hz).

Recording the elastic shear modulus (G'), viscous modulus (G"), and TanD on a range of strain from 1 to 610% takes approximately 8 minutes. From the various plots of G' as a function of percentage strain, the values at 12% strain were all in the linear viscoelastic region. The G'@12% strain value was therefore selected in order to follow the increase in elastic shear modulus as a function of time curing of the specimens described in the Examples.

The gel content of the polypropylene sheet after 24 hours curing was measured and recorded in Table 1. Gel content was determined using method ISO 10147 "Pipes and fittings made of crosslinked polyethylene (PE-X)—Estimation of the degree of crosslinking by determination of the gel content". The principle of the test consists in measuring the mass of a test piece taken from a moulded part before and after immersion of the test piece in a solvent (8 hours in refluxing xylene). The degree of crosslinking is expressed as the mass percentage of the insoluble material.

Comparing Examples 1 to 6 with Comparative Examples C1, we can observe the significant effect of the formulation of our invention for preventing the degradation of the polypropylene in comparison to formulation made with peroxide and absence of any additive (Comparative example 1). Examples 1 to 6 show higher torque values than C1, approaching the torque value of PP without peroxide (Comparative Example C2). Examples 1 to 6 also show substantial crosslinking as illustrated by the high G' and gel content values obtained after curing for 24 hours in a water bath containing 1% acetic acid, which results from the good grafting efficiency of the silane of our invention to the polypropylene resin.

Comparing Example 6 with Comparative Examples C3 and C4, we can observe that both the unsaturated monomer and the organosilicone compound are required to achieve good grafting efficiency of the silane of our invention to the polypropylene resin resulting in good crosslinking. Indeed Comparative Examples C3 containing only the organosilicone compound shows high polypropylene degradation and only marginal crosslinking and Comparative Examples C4 containing only the unsaturated monomer shows limited degradation but almost no crosslinking while formulation of Example 6 shows significant effect for degradation prevention and substantial crosslinking.

TABLE 1

|  | Example 1 | Example 2 | Example 3 | Example 4 | Example 5 | Example 6 | Comparative Example C1 | Comparative Example C2 | Comparative Example C3 | Comparative Example C4 |
|---|---|---|---|---|---|---|---|---|---|---|
| PP | 100 | 100 | 100 | 100 | 100 | 100 | 100 | 100 | 100 | 100 |
| Porous PP | 10 | 10 | 10 | 10 | 10 | 10 | 10 | 10 | 10 | 10 |
| DHBP | 0.2 | 0.2 | 0.2 | 0.2 | 0.2 | 0.2 | 0.2 | — | 0.2 | 0.2 |
| Irganox ® 1010 | 0.5 | 0.5 | 0.5 | 0.5 | 0.5 | 0.5 | 0.5 | 0.5 | 0.5 | 0.5 |
| Irgafos ® 168 | 0.5 | 0.5 | 0.5 | 0.5 | 0.5 | 0.5 | 0.5 | 0.5 | 0.5 | 0.5 |
| Sorbaldehyde | 1.5 | — | — | — | — | — | — | — | — | — |
| 4-vinylaniline | — | 1.8 | — | 1.8 | 1.8 | — | — | — | — | — |
| 2-Methoxy-4-vinylphenol | — | — | 2.3 | — | — | — | — | — | — | — |
| 3-glycidyl sorbate | — | — | — | — | — | 2.6 | — | — | — | 2.6 |
| Z-6011 | 3.4 | — | — | — | — | 3.4 | — | — | 3.4 | — |
| Z-6040 | — | 3.6 | — | — | — | — | — | — | — | — |
| 3-Isocyanatopropyl-triethoxysilane | — | — | 3.8 | — | 3.8 | — | — | — | — | — |
| 3-Isocyanatopropyl-trimethoxysilane | — | — | — | 3.8 | — | — | — | — | — | — |
| Torque (Nm) | 62 | 84 | 61 | 37 | 37 | 45 | 15 | 77 | 19 | 41 |
| G'@12% strain (After Curing) (kPa) | 16 | 33 | 16 | 5 | 3 | 17 | — | 13 | 0 | 2 |
| Gel Content (%) | 40 | 50 | 32 | 41 | 41 | 70 | 0 | 0 | 5 | 3 |

The invention claimed is:
1. A composition comprising a polyolefin and unsaturated monomer (A) containing an olefinic —C═C— bond or acetylenic —C☰C— bond and a reactive functional group X, wherein the unsaturated monomer (A) contains an aromatic ring or a further olefinic double bond or acetylenic unsatura- tion, the aromatic ring or the further olefinic double bond or acetylenic unsaturation being conjugated with the olefinic —C=C— or acetylenic —C≡C— unsaturation of the unsaturated monomer (A), and the composition further comprises an organosilicon compound (B) having a functional group Y which is reactive with the functional group X of the unsaturated monomer (A):

wherein the unsaturated monomer (A) is 4-vinylaniline and the organosilicon compound (B) contains an epoxide or isocyanate group or the unsaturated monomer (A) is 2-methoxy-4-vinylphenol and the silicon compound (B) contains an isocyanate group.

2. A composition according to claim 1 wherein the polyolefin comprises at least 50% by weight units of an alpha-olefin having 3 to 10 carbon atoms.

3. A composition according to claim 1 wherein an organic peroxide compound capable of generating free radical sites in the polyolefin is present at 0.01 to 2% by weight of the polyolefin during reaction with the unsaturated monomer (A).

4. A composition comprising a polyolefin and unsaturated monomer (A) containing an olefinic —C=C— bond or acetylenic —C≡C— bond and a reactive functional group X, wherein the unsaturated monomer (A) contains an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation of the unsaturated monomer (A), and the composition further comprises an organosilicon compound (B) having a functional group Y which is reactive with the functional group X of the unsaturated monomer (A);

wherein the unsaturated monomer (A) contains an electron-withdrawing moiety with respect to the olefinic —C=C— or acetylenic —C≡C— bond; and wherein the unsaturated monomer (A) is sorbaldehyde and the organosilicon compound (B) contains an aminoalkyl group or the unsaturated monomer (A) is glycidyl sorbate and the organosilicon compound (B) contains an aminoalkyl group.

5. A composition comprising a polyolefin and unsaturated monomer (A) containing an olefinic —C=C— bond or acetylenic —C≡C— bond and a reactive functional group X, wherein the unsaturated monomer (A) contains an aromatic ring or a further olefinic double bond or acetylenic unsaturation, the aromatic ring or the further olefinic double bond or acetylenic unsaturation being conjugated with the olefinic —C=C— or acetylenic —C≡C—unsaturation of the unsaturated monomer (A), and the composition further comprises an organosilicon compound (B) having a functional group Y which is reactive with the functional group X of the unsaturated monomer (A);

wherein the organosilicon compound (B) is a mainly linear organopolysiloxane fluid wherein at least 50 mole % of the siloxane units are D units and containing at least one group of the formula Y—Z'— wherein Z' is a divalent organic linkage bonded to the organopolysiloxane fluid.

6. A composition according to claim 5 wherein the organopolysiloxane fluid is polydimethylsiloxane having at least one terminal group of the formula Y—Z'—wherein Z' is a divalent organic linkage bonded to the organopolysiloxane fluid through a C—Si bond.

* * * * *